8488X
J. Williston.
Floating Dock.
No. 7
Patented Nov. 6, 1834
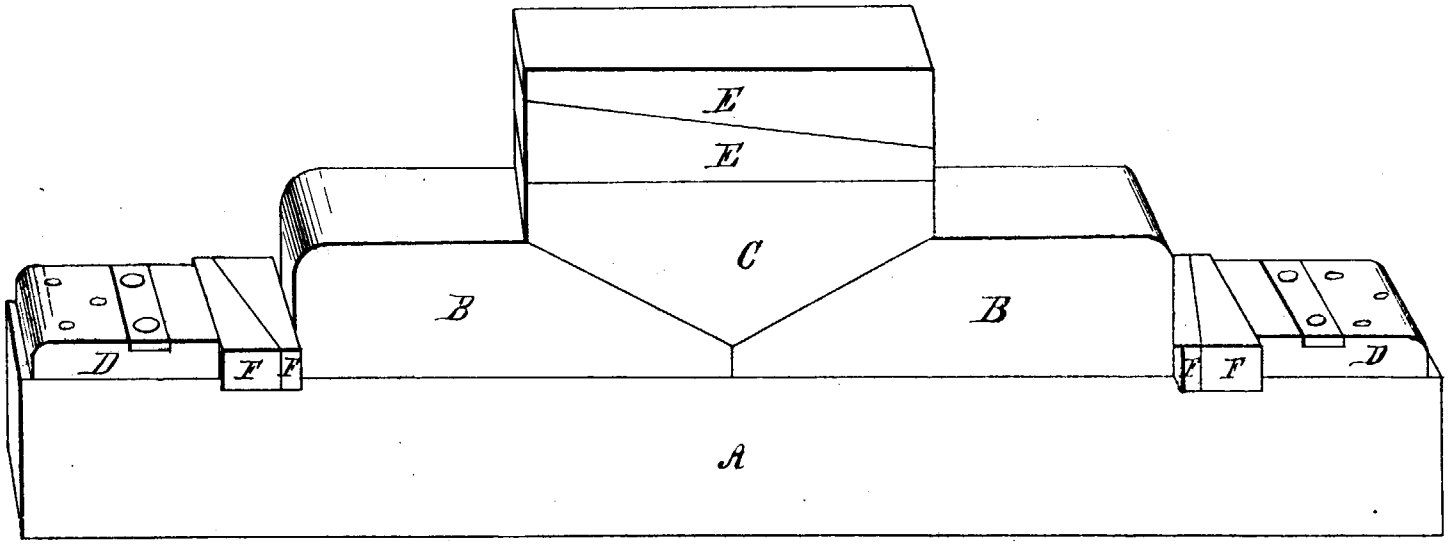
N. PETERS, PHOTO-LITHOGRAPHER, WASHINGTON, D. C.

Nov. 6. 1834

John Williston of Portsmouth State of Virginia —

8488X

Letters Patent.

The schedule referred to in these Letters Patent and making part of the same containing a description in the words of the said John Williston himself of his improvement in blocks used in docking and building vessels, and other purposes.

To all to whom these presents shall come.

Be it known that I John Williston of Portsmouth, in the County of Norfolk and State of Virginia, have invented a new and useful improvement in blocks used in docking and building vessels and other purposes; and that the following is a full and exact description of the same as invented or improved by me, Description of the improved blocks, used in docking & Building vessels and for other purposes. 1st a ground block of convenient size for the intended purpose lying horizontally and at right angles to the direction of the keel, — 2d. A rider block surmounting the ground block, and divided into equal parts by a vertical cuneiform section the faces of which, inclined to each other at an angle of about one hundred and twenty degrees. The rider block is prevented from separating at the cuneiform section, by strong cleats firmly secured to the upper surface of the ground block; leaving however, a space at each end, sufficiently large for the reception of married wedges.

3d. Two alternate or married wedges, equal in length and breadth to the cuneiform section and resting thereon. Form of Operation.

These blocks if used in a Dock, must be well secured to the floor; to prevent them from rising, on the admission of the water, as the water is withdrawn the vessel must be carefully placed upon the centre of the alternate wedges, if used otherwise, on the centre of the cuneiform section. When it becomes necessary to remove a block, or blocks, the married wedges at the ends of the rider, are withdrawn, by which process the cuneiform section falls sufficiently low to be removed.

The alternate wedges resting on the cuneiform section, are to be used when deemed expedient, to give greater support to any particular part of a vessel, than could be imparted by the wedges

[illegible] from specification

8488X

182.

at the ends of the rides

John Milliston

Witnesses

Jno. A. Freeman

Wm. H. Nash

Drawing 434 hds

Ex.

Ch. Jl. 434 hds